(12) United States Patent
Van Der Donk

(10) Patent No.: US 12,459,544 B2
(45) Date of Patent: Nov. 4, 2025

(54) FLEXIBLE COMBINED TRANSPORT OF PEOPLE AND FREIGHT

(71) Applicant: MISSION INNOVATIONS B.V., Eindhoven (NL)

(72) Inventor: Johannes Gertrudis Josephus Van Der Donk, Best (NL)

(73) Assignee: MISSION INNOVATIONS B.V., Eindhoven (NL)

( * ) Notice: Subject to any disclaimer, the term of this patent is extended or adjusted under 35 U.S.C. 154(b) by 934 days.

(21) Appl. No.: 17/290,143

(22) PCT Filed: Oct. 8, 2019

(86) PCT No.: PCT/IB2019/001061
§ 371 (c)(1),
(2) Date: Apr. 29, 2021

(87) PCT Pub. No.: WO2020/089683
PCT Pub. Date: May 7, 2020

(65) Prior Publication Data
US 2022/0001901 A1    Jan. 6, 2022

(30) Foreign Application Priority Data
Oct. 30, 2018   (NL) ..................... 1043058

(51) Int. Cl.
*B61B 1/00*        (2006.01)
*B61D 1/00*        (2006.01)
*B61D 3/20*        (2006.01)

(52) U.S. Cl.
CPC ............. *B61B 1/005* (2013.01); *B61D 1/00* (2013.01); *B61D 3/20* (2013.01)

(58) Field of Classification Search
CPC .. B61B 1/00; B61B 1/02; B61B 1/005; B61D 1/00; B61D 3/20

(Continued)

(56) References Cited

U.S. PATENT DOCUMENTS 2,561,927 A * 7/1951 Janeczko ............ B61D 3/04
                                                    187/207
3,484,002 A    12/1969 Barry
(Continued)

FOREIGN PATENT DOCUMENTS

CN    107792081 A    3/2018
DE     9116376 U1    8/1992
(Continued)

OTHER PUBLICATIONS

International Search Report dated Feb. 7, 2020 for PCT/IB2019/001061.

*Primary Examiner* — S. Joseph Morano
*Assistant Examiner* — Heaven R Buffington
(74) *Attorney, Agent, or Firm* — Suiter Swantz IP

(57) ABSTRACT

A method and system for the flexible combined transport of persons and/or freight via rail or road. A coordination system coordinates the total transport capacity and the specific demand for transport of passengers and freight in real time and dynamically. The coordination system registers the existing capacity of persons and freight of a transport means, determines a residual capacity, defined by the difference between the passenger capacity and the passenger transport demand, and determines a transformation capacity, which is determined by the size of the residual capacity that can be transformed for the carriage of freight. The freight capacity is determined by the transformation capacity and the existing freight capacity. A multi-functional transport modality for rail or road and other support means for the realization of an efficient and resilient mobility system for passengers and freight.

8 Claims, 2 Drawing Sheets

(58) Field of Classification Search
USPC .......................... 104/27–31; 105/329.1, 370
See application file for complete search history.

(56) References Cited

U.S. PATENT DOCUMENTS

| | | | | |
|---|---|---|---|---|
| 4,005,902 | A * | 2/1977 | Balin | B60N 2/3065 |
| | | | | 297/15 |
| 2005/0038575 | A1* | 2/2005 | Wu | B61L 27/04 |
| | | | | 701/19 |
| 2010/0021257 | A1* | 1/2010 | Hall | B61B 1/005 |
| | | | | 414/809 |
| 2011/0107938 | A1* | 5/2011 | Weidemann | B61D 3/18 |
| | | | | 104/29 |

FOREIGN PATENT DOCUMENTS

| | | | | |
|---|---|---|---|---|
| DE | 4306960 | A1 * | 10/1993 | ............ B61B 1/005 |
| DE | 29616091 | U1 | 12/1996 | |
| EP | 0595444 | A1 | 5/1994 | |
| WO | 2015121506 | A2 | 8/2015 | |
| WO | WO-2015118186 | A2 * | 8/2015 | ............ B61B 1/005 |
| WO | WO-2018104801 | A1 * | 6/2018 | ............... B65G 1/04 |

* cited by examiner

FLEXIBLE COMBINED TRANSPORT OF PEOPLE AND FREIGHT

TECHNICAL FIELD

The invention relates to the transport of passengers and freight by road and rail by densely populated urbanized areas and sparsely populated areas such as in the Netherlands.

BACKGROUND

In the analysis of road traffic, freight traffic has been shown to have an increasing impact on traffic flows, resulting in increasing economic and environmental damage. In rail traffic, there is a lack of sufficient capacity for the transport of people during peak hours. The use of more material is often not possible in the current setup.

Freight transport on the railways shows that it is often only a very small part, consisting of domestic freight traffic and that the amount of domestic freight traffic is almost negligible in total domestic freight traffic. In the Netherlands, for example, the transport of domestic road freight traffic is 200 times the size of domestic freight traffic across the railways.

Supermarkets that are mainly in the middle of urban areas often provide a huge share of the transports. From a cost aspect, the freight are brought into the cities with large lorries, while there is a tendency that cities, in connection with flow, safety and the environment, no longer want to have heavy traffic in the urban area.

Further problem with such voluminous loads is that often a warehouse gets overcrowded with thereby risk of accidents and inefficiency.

Finally, there is a shortage of lorry drivers in some countries.

BRIEF SUMMARY

The purpose of the invention is to reduce road freight traffic. A further goal is to make passenger transport cheaper and more efficient by improving the use of staff and equipment. A further goal is to achieve environmentally friendly and efficient forms of freight traffic with better flow and with less tax or more efficient use of existing infrastructure. Finally, it is a goal not to compromise the quality, reliability, capacity and comfort of the transport operations in passengers and/or freight transport.

The objective is achieved by the present invention, which proposes to adapt trains and optional infrastructure, platforms, logistics, storage and loading systems in such a way as to distinguish between passenger and freight transport Rail is at least partially lifted, with trains being arranged to be able to transport passengers and/or freight, depending on the supply of passengers or freight.

Further details are also described in the following clauses.

1. A method for the flexible transport of passengers and/or freight, the method of which uses one or more transport means and a traffic infrastructure, characterized in that, the method includes that the one or more transport means of choice are used for the transport of passengers or the transport of freight or a combination of passengers and freight, in which the determination of the choice is carried out or supported by a coordination system which comprises a calculation unit, a memory unit and a communication unit, whereby the method further includes the following steps:

A. the coordination system records the passenger transport demand, which is determined by the number of passengers who will make use of passenger transport in a location and in a given time frame;
B. the coordination system registers the freight transport demand from a logistical system which is arranged for communicating a freight transport demand to the communication unit of the coordination system, said freight transport demand further determined by the size of freight to be transported from the location and around the specified time frame, the size of which is determined by volume, size and/or shape of the freight;
C. the coordination system records or retrieves from the memory unit which comprises a database containing data on one or more transport means, a passenger capacity of a transport means of the one or more transport means that is present or is expected to be at the location and in the given time frame, said passenger capacity being determined by the number of places available in the passenger carriage available in the transport means;
D. the coordination system shall record or retrieve from the database, an extensible freight capacity of the transport means, which expandable capacity of freight is determined by the size of the space that can be added for the transport of freight
E. the coordination system shall calculate or register the transport means residual capacity, determined by the difference between the passenger capacity and the passenger transport demand;
F. the coordination system calculates or registers the transport means transform capacity, which is determined by the size of the residual capacity that can be transformed for the freight transport demand.
G. the coordination system calculates a freight capacity of the transport means, which is determined by the transform capacity of the extendable cargo capacity;
H. the coordination system communicates the freight capacity to the logistics system by means of the communication unit.

2. The method according to clause 1, characterized in that the coordination system of the transport means registers parameters in relation to the transported freight, on the basis of which the transport costs of the freight are calculated.

3. The method according to clause 2, characterized in that the parameters include: type; position; weight; volume; residence time in the transport means; traveled route; client; service level; price arrangements.

4. A system for the flexible transport of passengers and/or freight, where the system includes one or more transport means and a traffic infrastructure, characterized in that, the system includes the following elements: a coordination system, comprising a calculation unit, a memory unit and a communication unit, whereby the coordination system is arranged for coordinating the transport of passengers, freight or a combination of passengers and freight by transport means, using the method according to any one of the preceding clauses; and a transport means arranged for the transport of passengers, whereby the transport means can also be arranged for the transport of passengers, freight or passengers and freight.

5. The system according to clause 4, characterized in that the transport means includes a connection device that is configured to optionally have a removable passenger unit arranged for the transport of passengers, or a freight unit arranged for the transport of freight.

6. The system according to clause 4 or 5, characterized in that the freight unit comprises one or more of the following configurations: a conduction mechanism arranged to guide freight from, to and/or within the freight unit; a positioning system arranged to determine the position of the freight unit; a communication system arranged to communicate with a loading system and/or the coordination system; monitoring-, signaling- and alerting devices; a height-adjustment device arranged to adjust a floor of the unit of the freight; and an adjustable drive plate arranged to be adjusted to the position of loading and/or unloading of freight.

7. The system according to any one of clauses 4-6, characterized in that the system further comprises a control unit arranged to regulate aspects of the transport of passengers in the passenger unit, whereby an aspect of the aspects comprises any one of the following aspects: the recording of a person's reservation for the transport of that person in the passenger unit; capturing a certain service level of that person; the reservation of a particular place in the passenger unit; and communicating a place at a location where the person unit is scheduled to stop for admitting the individual in the passenger unit.

8. The system according to any one of the clauses 4-7, characterized in that the system further comprises a positioning system, arranged to place the transport means at a position at the spot where freight and/or passengers are to be taken by the transport means.

9. The system according to one of clauses 4-8, characterized in that the system further comprises a trailer arranged to transport the freight and arranged to be coupled with a towing vehicle, characterized in that the trailer is arranged to be moved, if disconnected from the towing vehicle, to the transport means, to the position of which the trailer can be loaded or unloaded, and where the trailer is further arranged to be moved in autonomous- or hand-operated mode.

10. The system according to any one of the clauses 4-9, characterized in that the system further comprises a delivery vehicle, arranged to load and unload the freight by means of a rotating device in the delivery vehicle, the rotating device arranged to store freight in a sorted manner and to provide selectable access to the cargo or to an empty spot in rotating device, by means of turning the rotating device in the delivery vehicle.

BRIEF DESCRIPTION OF THE DRAWINGS

The figures show views of implementing forms in accordance with the present invention

DETAILED DESCRIPTION

Figure 1:
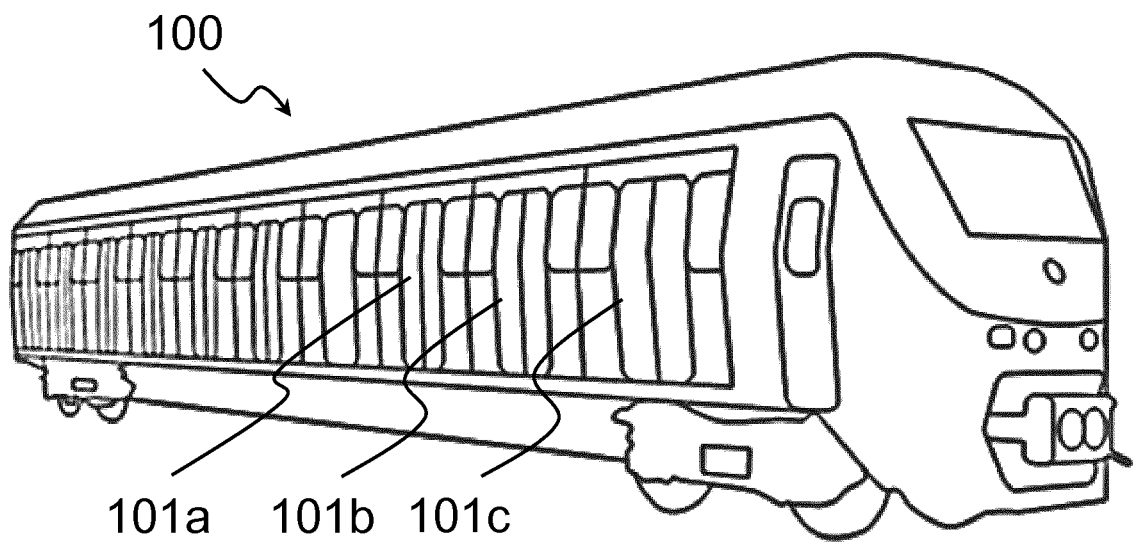
FIG. 1 shows a perspective view of the execution form of a transport means according to the invention.

The invention is now described by the following aspects and forms of execution, with reference to the figures.

The following section is a shortened description of an original piece written by the inventor. That original piece is included in the description after the shortened description.

The trains (wagons) are arranged for this purpose in order to transport mainly passengers during peak hours with an increased need for passenger transport by rail and in off-peak hours in order to transport also or above all freight.

Since it is a purpose of the invention to maintain comfort of passengers and quality of freight transport, or even to improve, as part of the inventions, a number of measures are proposed which are as separate implementing forms are proposed, but in combination have a synergistic effect, that is, that the measures reinforce each other in achieving the purpose of the invention. However, it is clear that the measures are also a separate improvement, at least contributing to the achievement of the objectives of the invention, which, among other things, proposes the following.

1. An automatic loading and unloading system that loads and dissolves freight in a very short time. The maximum loading and unloading times are determined by the time that a passenger train normally needs in order to allow the passengers to step in and out.
2. The trains are operated with a system that allows the train to stop at the platform at the desired location. This uses an indoor navigation and positioning system and or other systems.
3. Part of the wagons are carried out as passenger units and part as freight units.

Person Unit

A train is equipped with a removable unit that is arranged for transporting people. The passenger unit can be optionally furnished with: amenities such as seating, wall sockets and Wi-Fi facilities; additional doors are added to facilitate quick entry and exit; an automated system arranged to assign or have a person reserve a place with a particular service level, such as access to a toilet; the system can, for example, give the person indications of the place where he should be set up on the platform to be at the correct entrance of the passenger unit when the train stops; and an aisle for, for example, a conductor or the accessibility of certain facilities or due to statutory regulations.

Freight Unit

If the demand for passenger transport is small, the passenger unit can be replaced by a freight unit.

Different solutions are proposed to facilitate the changing of the different types of units. The swap can take place at a designated stop.

An alternative to removing the passenger unit is to build it with the wall or ceiling or in the floor manually or (semi-) manually or fully automatic folding furniture.

This freight unit can optionally be equipped with: a reinforced floor; guides and positioning systems; electronic systems enabling communication with charging systems; monitoring, signaling and alerting devices; a height adjustment for the floor automatically adjusts the correct height of the loading floor to the platform height. This can happen immediately after it has come to a standstill and then with electronics and sensors that measure the altitude difference and then make the required elevation correction and store this data in an available electronics system memory so that the following Once that location is done, the possible floor height adjustment can be carried out before it has come to a standstill. The height adjustment can also be used to load higher-lying parts; an automatic drive plate that occupies the right position that allows the freight unit to be easily loaded. The drive plates are optionally distributed over (almost) the entire length of the freight unit; on both sides wagon doors.

Positioning System

The platform and/or the train can be provided with a positioning system to achieve or determine the exact position of the train, after it has been fully stopped, so that the loading system (preferably) can advance the correct positions Prepare the cargo for the correct loading doors of the freight units.

The figures illustrate various forms of execution and are described as follows.

FIG. 1 shows a perspective of the embodiment of a transport means 100 According to the invention, for example proposing a train with interchangeable units 101a, B, C. These units may involve passenger units or freight units, or a combination of both, depending on the need for transport of the one or the other.

Figure 2:
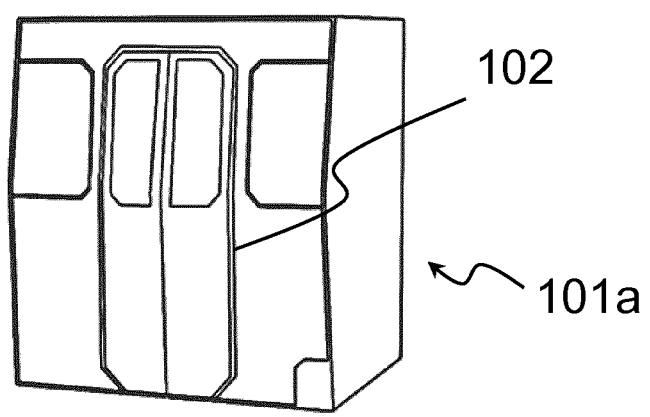
FIG. 2 shows a perspective view of an embodiable module, such as in and out of the transport means in FIG. 1.

FIG. 2 shows a perspective of an embodiment of an interchangeable module 101, such as in and out of the transport means in FIG. 1, where the unit can relate to a freight unit or a unit of passengers.

Figure 3:
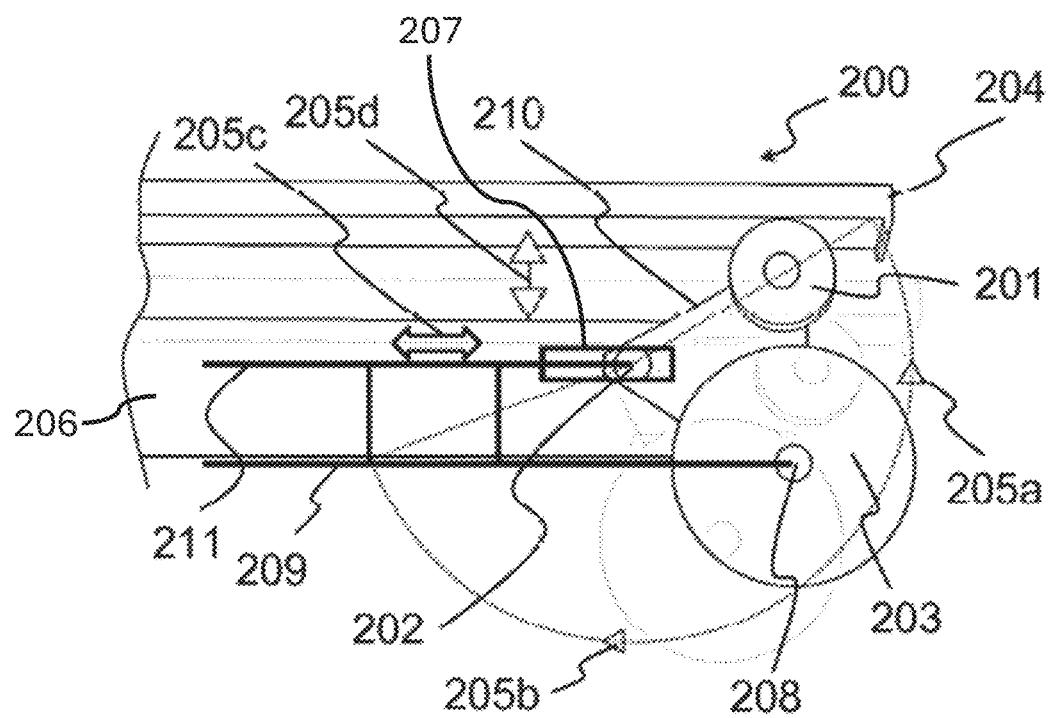
FIG. 3 shows side view of an initial embodiment of a pallet robot die height adjustable.

FIG. 3 shows side view of a first embodiment of a pallet robot 200 which is adjustable in height. To facilitate interpreting FIG. 3, here is a list of descriptions of the reference numbers used in the drawing.
- 201 push wheel
- 202 Rotating axle movable in a slot in the frame POS 6
- 203 Wheel with internal motor
- 204 lifting Platform
- 205a . . . d a possible movement driven by the spindles
- 206 frame with slots 2013 for axle POS 2
- 207 mechanical clutch spindles anchored on frame POS 6
- 208 axle front wheel 203
- 209 Spindle
- 210 push bar
- 211 Spindle
- 212 angle push bar 210

Spindle 209 is located on the axle 308, which can be left or right as 208, and rotates around 202 in direction 205b and 205a respectively. This makes the push wheel 201 Higher or lower and as a result, lift platform 204 Also rises or decreases how depending on the shape and position of the handlebar 210.

202 is spindle 211. This pushes axis 202 to the left or to the right 205c. If the pallet robot is under a pallet it may be that the wheelbase should be enlarged, for this the rotation axis 202 is moved to the right. Spindle 209 and spindle 211 are mechanically coupled to each other and to a frame, making the tilt movement 205d as far as possible on the outside of the plateau takes place. On the other side of the pallet robot, the same thing happens with a move to the left.

A sensor can be used as a tool for extra protection so that the components cannot come out under the pallet. In addition, an edge at the bottom of the plateau can provide better stability.

If we provide the pallet robot on all sides of this construction, the pallet can be lifted and driven to the left or right.

If we put the castors left, right, behind, and for mention then we have the following situation. Left and right at the highest position; fixed castor wheel front and rear are free from the ground and do not carry the plateau. This can be captured by letting the push-on bracket 210 from front and rear at the rotary shaft 202 come against the plate. The rotation axle 202 is part of the frame and is very sturdy.

The wheels with the motors can be very wide and possibly spring hung on as 208. They can consist of wheels with impressing tires associated with bumps. An option is build-up from multiple segments with multiple motors so that control can be optimal.

This concept can be built in various ways, also using hydraulic or pneumatic functions.

Figure 4:
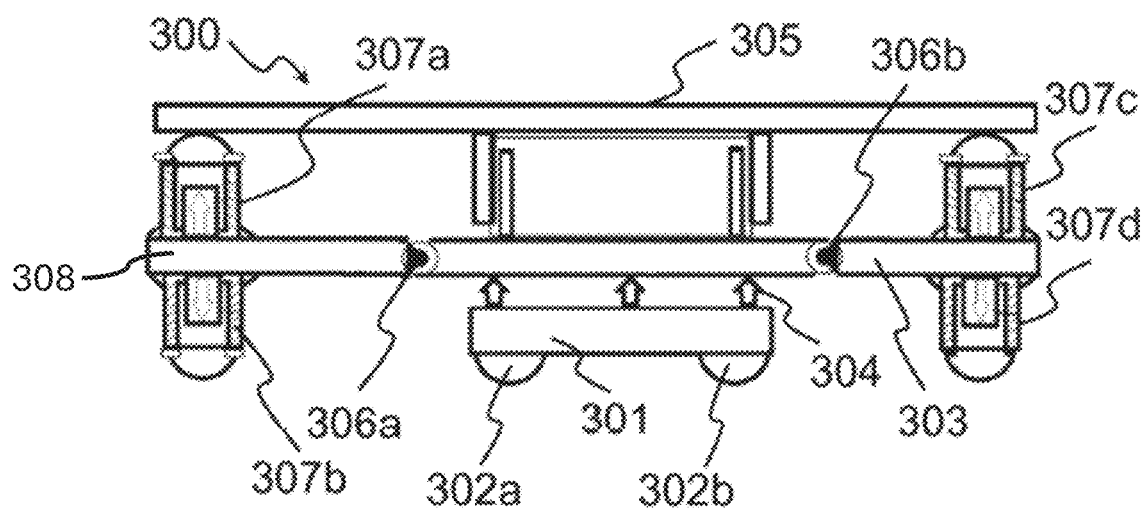
FIG. 4 shows side view of a second execution form of a row and lift-part of a pallet robot.

FIG. 4 shows a side view of a second execution form of a row and lift-part of a pallet robot 300. To facilitate interpreting FIG. 3, here is a list of descriptions of the reference numbers used in the drawing. 301 box with control panel, battery/charging device, sensors, communication and navigation facilities.
- 302a,b drive wheels possibly configured as mecanum or omni wheels.
- 303 in-between plate with hinged parts.
- 304 HEye-catching drive wheels driven by EleKlain with sensors.
- 305 hefplateau movable mounted on intermediate platform.
- 306a,b hinges;
- 307a . . . d motor driven height control/lifting cylinder/ball pot wheel, optionally with hydraulics.

Additional battery capacity can be made by taking batteries in or out.

Introduction

The invention relates to the transport of passengers and freight by road and rail by densely populated urbanized areas and sparsely populated areas such as in the Netherlands. The ever-increasing capacity problems, especially during rush hours, ensure unacceptable situations and delays in road and rail traffic, resulting in increasing economic and environmental damage. In the analysis of road traffic, freight traffic has become increasingly influential in traffic flow. In rail traffic, there is a lack of sufficient capacity for the transport of people during peak hours. The use of more material is often not possible in the current setup. In the transport of freight by rail, figures from the CBS show that in the Netherlands only a very small proportion consists of domestic freight traffic and that the amount of domestic freight traffic is a virtually negligible proportion of the total Domestic freight traffic. The transport of domestic freight traffic by road is about 200 times as large as the domestic freight traffic over the rail.

By transporting a large (⅓) part of the road freight transport in an innovative way, we are largely solving the problem for road transport. By linking here, a number of other innovative solutions it goes away Transport problem is almost entirely solved. The concept also results in a solution for the rush of rail traffic.

In addition, there is another problem to solve. By urbanization, problems have arisen in a number of areas due to the decreasing number of inhabitants.

As a result, mobility by means of public transport and higher costs for supply is becoming an increasingly acute problem. Public transport and freight transport are threatened by the very unprofitable transport possibilities in its survival. This problem can also be solved by the concept.

In the Netherlands and worldwide, container and pallet transport have taken place in the transport sector. Due to the developments in the supply of freight and the available possibilities we have to come to a completely new supplementary concept of transport of freight. The heavy bulk freight (such as coal, oil, chemicals, etc.) are offered to much lesser extent for road and rail transport. We see a huge increase in transports with larger volumes consisting of a greater diversity of freight with low weights and with much more demands on delivery speed.

The more than 6000 supermarkets in the Netherlands, which are mainly in the middle of the urban areas, now offer a huge share of the transports. From the cost aspect, the freight are brought into the cities with huge lorries, whereas precisely in connection with the flow, safety and environment, no heavy traffic want to have more in the city area.

Further problem with such voluminous loads is that often a warehouse gets overcrowded with thereby risk of accidents and inefficiency.

In addition, this concept ensures that the objective in the new climate law to know a reduction of 7.3 billion kg of $CO_2$ caused by traffic can be solved quite easily.

The causers, namely the movement of freight and the movement of passengers, are really being tackled. The freight traffic and the many vans are reduced by a huge amount, which means that the traffic jams almost disappear and the rest of the movement is going to drive much more energy-efficient thanks to the much better flow.

The transport of freight then goes for a huge part via rail. Rail traffic emissions are almost negligible in size.

According to many recent reports, the rail network in the Netherlands is overcrowded and threatens to go down. Innovative solutions to overcome this problem. The introduction of new technology can contribute to this. An example of this is the European Rail Traffic Management System (ERTMS) that allows trains to drive much closer together.

Nederlandse Spoorwegen (NS) invests up to 2023 approximately €4 billion in mainly new and adaptable trains and wagons. They try to get money from the government to give the passengers 40% discount if they avoid the rush between 7.30 and 8.30 hours. They want this money because they don't have it. The money should come from an environmental pot because transport by train is much more environmentally friendly than car traffic.

The Secretary of state is studying and weighing up other ideas.

Furthermore, the joint authorities invest more than 10 billion annually in the infrastructure. According to the CBS, we are talking about operating revenues in the transport sector, by land for 2016 over an amount of 29 billion € of which costs are directly attributable to land transport 19 billion €. These costs are due to the fact that a very large part of the fleet can expire and because the costs due to the increased automation and lower trans-sport costs, are also considerably reduced by the approach according to my concept. The cost of transporting freight will increase enormously through the tightening of environmental standards and inefficient transport as a result of more and more traffic jams and restrictive measures in accordance with the now common methods and ensure that investments Are not going to pose a problem in the concept. In the end, a big advantage will be gained because with this concept more deliveries go directly from the manufacturer to the shops without first being collected in a distribution centre. The result is less transport and smaller distribution centers. The shortage of drivers is solved, and a part can be integrated into the new concept.

So, take the considerable savings in the cost of the environment, and then we are all spending a lot of money within a few years.

Also, the NS and other carriers can become very profitable because the revenue model changed from income from passenger transport to much higher revenues from the freight transport and are going to invest in this development. They also have money to deal with ProRail stagnation as a result of incidents (disturbances, collision with people and animals, the square wheels problem once again, which is important for the concept as well. Passenger transport is much cheaper due to better use of staff and equipment, which means that the costs for the passenger can be considerably reduced, so that much more usage is made of this more environmentally friendly form of transport and thereby the It will significantly relieve road traffic, resulting in a better flow and therefore a lot of savings in costs and environmental pollution resulting from a better flow.

Different Execution Forms and Implementations of the Invention

In the rail traffic in the Netherlands, the capacity of a very large part of the rolling stock and rail, but for a few hours a day, is exploited to a large extent. A significant part of the day drive the approximately 350 passenger train couples with a very small number of passengers around.

By executing the next invention and the trains and platforms to adapt and start using for both passengers and freight transport we can come to a much more efficient mode of transport without this degradation to the passenger's comfort.

The trains (wagons) can be made suitable for transporting people and whether freight where the emphasis is on passenger transport during peak hours, in the slightly quieter hours on transport of passengers and freight and in the off-peak hours and night the accent on Freight transport.

By combining freight and passenger transport without sacrificing the quality and quantity of passenger transport, we must ensure an innovative automatic unloading and loading system that solves and loads the freight in a very short time, in the Time a passenger train normally has to let the people step in and out. At the same time, we want to make the journey that a passenger needs to move as short as possible so that the frequency of rail transport can be increased as high as possible without sacrificing the passenger. The trains are carried out with a system that allows the train to stop at the platform at the exact desired location. This uses an indoor navigation and positioning system and or other systems. We will (possibly) build a part of the wagons in passengers and freight units.

Passenger Units

These units are furnished for the transport of passengers with all required and possibly desirable amenities such as seats, wall sockets and Wi-Fi facilities etc., hereinafter referred to as the passenger unit. These units can be provided with a lot of transparent material for the sidewalls, for example.

Depending on the use of the train, one can choose different set up of the passenger units Multiple forms of execution can be chosen to meet the needs of the passenger. An example of this is access to a toilet from one or more units per wagon. In addition, the doors can be placed in the desired number on both sides of the wagon.

Choice of Units

An initial performance of a person unit (unit 1) concerns a performance in which several, preferably all passenger units are equipped with one or more doors, preferably on both sides of the passenger unit, allowing very fast in and Can be stepped out by several people tile look, whereby for example also the frequency can be stepped up in peak hours.

In addition, with automated systems, the passenger can already be assigned a place in different comfort classes, for example, with access to a toilet, so that it can already be set up in the right place in anticipation of the train. (Optionally indicated via app or info on platform). Also, a unit can be reserved for wheelchairs etc. and whether bicycles and the like.

The above provides less chaos and faster more comfortable and safer flow.

A second execution of the passenger unit (Unit 2) concerns a performance in which two or more passenger units are equipped with an aisle, where an aisle of a first unit can be connected to an aisle of a second unit, thus A continuous aisle is created. This implementation can be chosen if you want to be able to use an aisle for example, a conductor or the accessibility of certain facilities or due to legal regulations. Also, the maximally permissible train width can play a role in this.

A third person unit (unit 3) is a unit with possible interpretation of both concepts in one unit.

The middle seats of both rows may not be applied in part.

The other units can also be operated with reservation systems.

Freight Units

If the passenger unit is not used for the transport of passengers, all or part of the units, with or consisting of passenger transport facilities, shall be disposed of and the space released for the transport of freight will be used. For a quick installation and removal of this unit content, depending on the design can be chosen for various solutions such as self-propelled frame constructions with doors, connectors and other, to manual or other conversion methods.

This could normally be done at a start or end of a route, because the passengers have all stepped out at a certain moment and the new passengers have yet to board. An alternative to removing the passenger unit is to build it with the wall or ceiling or in the floor manually or (semi-) manually or fully automatic folding furniture.

The seats can be made from solid material. For the seat and backrest and any armrests, several layers of suitable material can be used to ensure sufficient firmness and seating comfort. In this case, air and or liquids or gel can be used to increase comfort and to expand the seats with pressure and or suction power and to fold them back with air pressure and or suction, possibly supported by electro/pressure mechanical or mechanical conductors/profiles/magnets and or motors that press and hold the seat in the correct shape. The seats can be equipped with armrests and all other desired comfort and are constructed in such a way that they do not cover or as minimal a floor area as possible so that the effective loading space remains the maximum. The advantage is that if the unit is in use for passenger transport, that the ever larger and variable need for space for bicycles, mobility scooters etc. can be filled in by one or several seats programmed to move up. This means that there is no separate, more expensive space for the desired and a barrage of passageways is a long time.

If this version is chosen, we will still speak of a commodity unit for the remainder of this concept. This alternative, of course, offers tremendous benefits in many areas such as efficiency/flexibility and costs for conversion and storage of interiors and can therefore claim a decent development and production cost budget.

Another alternative is to increase the wagon height and then let the complete floor with folding chairs and all up (excluding any toilet space) go so that almost the entire floor area is available for freight.

The above possibilities do not seem realistic; however, all ask for well thought out designs and very solid and interference-free construction that are certainly feasible with contemporary technology and materials. It may cost a little because the benefits are enormous.

The vacant space is called the freight unit. This unit of freight can be equipped with facilities such as a sturdy floor, guides and positioning systems and electronics systems that make the space in the unit part of the indoor navigation on the platform or the unloading and/or loading area. or positioning system whether or not in the floor to control the pallet robots and other items to be described hereafter, wireless charging systems for accumulators in pallets, antennas and transmitters for receiving and transmitting information from pallets and any re-Programming the pallet systems to be described below and possibly various monitoring, signaling and alerting and positioning systems.

Also, a device can be fitted in the platform and on the train which measures an exact position of the train after it has completely stopped and, on this basis, automatically the driver and the indoor navigation and positioning system present System to control the robot pallets and any other items adapts to these measurements. Alternatively, a height adjustment can be applied to the floor, which automatically adjusts the correct height of the unit floor to the platform height.

This can happen immediately after it has come to a standstill and then with electronics and sensors that measure the altitude difference and then make the desired elevation correction and store this data in an available electronics system memory so that the following Once that location is done, the possible floor height adjustment (preferably) can be carried out before it has come to a standstill. For safety, a control of the electronics and sensors could be checked and an agreement signal to the other items involved in loading and unloading can be given in a correct situation. In the case of deviations, an automatic correction order can be given to the items concerned which then execute them immediately and after execution send an agreement signal to the relevant items.

The height adjustment could also be used to create a possibility, for example, to be able to load higher-lying wagon parts above the wheels.

Furthermore, in the freight unit there is an automatic release that automatically takes the right position at or after opening the doors and any adjustment of the floor height that allows the pallet robots and other items to be transported From the platform, the unit in and from the unit can drive the platform or the unloading and or loading place.

Freight Software Control System

To enable a high degree of automation is used high quality software systems hereinafter referred to as freight software control system. The freight software control system can be a standalone system or be part of the coordination system. The Freight software control system can consist of a central main system for the entire flow of freight from producers and traders, transporters and customers, logistics and the various transport organizations including rail carriers, bus and Possible other companies, parcel services, maintenance organizations etc. Delivery to the end user or customer. It is supported by local complementary systems, including, for example, special navigation systems and techniques for buildings, platforms, unloading and loading locations, and in trains and lorries.

The Freight software control system can be self-contained and, on the basis of transport patterns, to generate an optimal, adjustable schedule of materials and people to be used automatically so that they can be played on time.

Outside these spaces, standard GPS (or other) navigation/positioning systems can be used.

Freight to be shipped are packaged and transported in or on special packaging/carriers with electronics and memory systems that are electronically equipped with all relevant data and characteristics. The transport of all freight is scheduled through the Freight software control system using the special packaging/carriers and is to be followed throughout the entire process.

During this transport, any changes in the route to be followed and whether times etc. can be made remotely. The status of the consignment can be monitored and adjusted continuously, or at certain points and in case of deviations due to malfunctions or by modification of the order. Blockchain techniques may be used for this. The delivery is automatically reported and the status for the special packaging/carriers with the electronics and memory systems is programmed in coordination with the carrier and the customer, which can be done almost automatically.

In order to make a very fast efficient loading possible, almost fully automatic controlled and programmed pallet robots and special pallet and other items and systems are used.

Different unloading and loading possibilities can be used depending on the possibilities of the soft and hardware. By creating a fixed place for pallets, the software is easier to set up and the pallet robot can easily drive under pallets which can benefit the loose and load speed.

The choice for optimal (maximum) loading can also be made. The control must consider pallet dimensions and pallet placements and the route the pallet robot can still drive.

Another implementation is to ensure that all pallet robots involved and other self-propelled items before the relevant train arrives with wagons the desired information about the space and content of the Already acquire the planned freight unit and perform various operations such as any moving of items and themselves, taking into account all other items that may be moved or move, so that the shortest possible loosening and Loading time is created. However, the correction of the exact location of the freight unit after the standstill of the train is still necessary. A wagon can also be classified in imaginary freight units without physical separations and possibly carried out with internal navigational means so that existing or build freight wagons may also be used during the start-up phase of the project. The desired maximum stop time can then be ignored. These wagons could also be used for less crowded locations or the transport of special or deviant freight.

The system provides for several possibilities to achieve a very rapid processing of the various types of freight to be transported, considering the operations to be carried out in other places in the total transport system.

To make this possible, you can use a number of features included in or on the following items. The station/platform, the wagon, the freight unit, pallet, pallet truck, pallet truck-robot container 1, Freight plateau, container 2 and pallet robot. Other possible items can be added.

A number of specific components/systems for the purpose of communication, identification, control, drive, positioning, navigation, energy supply, security and safety are applied in the various items mentioned, if necessary.

There are a number of components, resources, or features listed in each item in the following descriptions that may be applied in or on the various items depending on the situation.

The Station/Platform

Supply to and disposal pallets by means of conveyor belts, chain jobs or alternative systems and a driving path for pallet robots and or other transport means.

Provision for the automated system-controlled loading and unloading of follow-on transport means other trains, trams, subways, containers, lorries or other means of service provided for that purpose including loading in facilities for Temporary storage possibly by self-propelled items or using pallet robots and or other tools.

Charging stations for the pallet robots and other transport means (preferably wireless).

Transmitters and receivers for data transmission.

Platform navigation system (this is not the standard GPS system).

Navigation assist system for precise positioning of pallet robots in freight units.

Calibration sensors and systems for the precise positioning of the freight unit including the height determination for the ripe leaves and floor height of the freight unit and systems to provide the pallet robots with this data so that their driving route is automatically can be adjusted accordingly. Possibly supplemented by means that, for example, a longer train can stop several times to automatically load or unload the different wagons with freight units, controlled using the Freight software control system.

Security and signaling using Lidar or alternative sensors and or scan and or laser systems against unintended passengers, freight or other objects or obstacles.

Support module for freight software control system.

An intelligent camera signaling to detect damage or contamination of transport means, transport routes and freight on which the necessary action is taken to prevent stagnation or other problems.

The wagon can be carried out with different types of units both for passengers and or freight transport.

Transmitters and receivers for data transmission.

Calibration Sensors and systems for the precise positioning of the freight unit including the height determination for the ripe leaves and floor height of the freight unit and systems to provide the pallet robots with this data so that their driving route is automatically can be adjusted accordingly.

Navigation assistance system for precise positioning of pallet robots in freight units.

Roller doors or alternative doors which, if required for loading or unloading, automatically open when the Freight software control system or other source is sent. (Immediately at standstill) and automatically close for driving away.

It is preferable to use doors that can be used both in the passenger unit and in the freight unit. Because people can sit directly along the door, attention must be paid to safety and comfort. Garments and other items must not be allowed to enter the door. In this case, electronic monitoring may be used, possibly combined with an additional shielding.

Ripe, which automatically takes the correct position.

A sturdy loading floor that adapts automatically to the platform height.

Alternatively, a system that aligns the floor height with the loading floor height of the units in which the system brings the entire wagon to the correct height.

Wireless chargers for pallets.

For extra stability of high containers, a supply can be fitted in the upper side. This may include a rubber (or other material) tire or plate, or a sturdy balloon, plate, net or mat that automatically comes on or against the pallets, container or pallet wagon when the door is closed and thus prevents the pallet from rocking or When pulling up or slowing down the wagon. Also, on the bottom and or sidewalls can be fitted with shifting equipment. This can be one or more locking pins, hooks, profiles or alternate parts that by placing the item to be loaded will automatically rise from the floor or down from the item and automatically deviate when the item is unloaded. It is also possible to make a fixed possibility by an electromagnets that are energized when the wagon is moved and switched off at standstill. This requires the use of magnetic equipment in the various items to be moved which do not hinder the further properties. When opening the door, the listed facilities will be removed.

Any provisions to allow the devices in the event of emergency passengers to be able to use this unit for passenger transport.

The pallet

Made of suitable and authorized materials for the types of freight to be transported and preferably accessible from four sides.

Has maximum space on the underside for the pallet robot.

Have such construction and facilities that enclosures, protections/packaging suitable for the diversity of freight to be transported are sound and effective.

Dimensions that correspond to national and international measurements.

Suitable for automatic and manual cleaning.

Suitable for transport and storage with the current and future usual transport and storage equipment.

A battery (or alternative storage device) for the required energy for the various items of the pallet.

Transmitting and receiving system for data transfer with the pallet robot and other system parts and communication with the freight software control system.

Storage and reading possibility of the data provided by the Freight software control system on the pallet itself, the current position, (this may be a place in the chain and then through the system Positioning system and possibly via a GPS or alternate place indication), the payload, the origin, the destination and other relevant matters (possibly encrypted in a code possible using blockchain technology).

A preferably contactless charging option, possibly by means of a quick charger via the pallet robot.

A sensor, tag or other tool for precise positioning by the pallet robot.

L) Sensors for protection against overloaded and wrong loading.

Energy-efficient electronics that only enters into force by a trigger signal through the unit or wagon or pallet robot or other source.

A self-test system for electronics and accumulator or other energy storage device that automatically notifies you of fault detection and automatically regulates the necessary actions for maintenance, repair or replacement.

The Pallet Wagon

This is a widely used form for transport to and in stores. We take the pallet truck by default without modifications. This pallet truck is run as an independent moving object controlled by remote control or controlled by the Freight software control system We call this custom version than pallet truck robot.

The pallet truck robot has all the facilities such as the pallet and the pallet robot described below, but also has a number of other facilities.

The pallet wagon is equipped with two castors and two wheels or alternative coil-means such as omni- and/or mecanum wheels, ball pots or tracks.

The pallet truck robot is equipped with one or more driven wheels. These wheels are steered in the same way as the pallet robot, however, has the ability to disconnect the drive on the wheels, so that the pallet carriage can be transported manually or in any other way.

The pallet truck robot has a switchable braking system that can block the wheels.

The pallet truck robot loads its battery or alternative energy storage device when rotating the wheels.

The pallet truck robot has a preferably lockable casing (or cover)

An initial execution of the container (container 1) has the following properties: made of suitable and authorized materials and preferably of two or more sides accessible to the pallet robot; has maximum space on the underside for the pallet robot; has a good closure against pests; suitable for automatic and manual cleaning; a battery (or alternative storage device) for the required energy for the various items; transmitting and receiving system for data transfer with the pallet robot and other system components and communication with the Freight software control system; the storage and reading possibility of the data provided by the Freight software control system concerning the pallet itself, the current position, (this may be a place in the chain and then through the system Positioning system and possibly via a GPS or alternate place indication), the payload, the origin, the destination and other relevant matters (possibly encrypted in a code); preferably contactless charging option; a sensor, tag or other tool for precise positioning by the pallet robot; sensors for protection against overloaded and wrong loading; energy-efficient electronics that only enters into force by a trigger signal through the unit or wagon or pallet robot or other source; a self-test system for electronics and battery that automatically notifies you of any error detection and automatically regulates the necessary maintenance, repair or replacement actions; is lockable and can be opened by sender and receiver with a digital or other secure code along with a (standard) key or with other shutdown methods; is equipped with automatic illumination; is equipped with lifting places for coupled pallet robots with sufficient carrying and lifting capacity and maneuverability; is equipped with a number of suspension castors and or ball-twisting wheels; is equipped with webbing or alternative with clamping possibilities; is provided with one or more roller doors or alternatives for this and or in-line/tail lift; is preferably provided with a driving aid piece/guide profile for the entry of the pallet truck; is equipped with a possibility to fasten the pallet wagon; is equipped with a brake (on several wheels at the same time or on the floor) at the roller door or alternative door or in-line/tail lift; is equipped with an ability to control these with one or more pallet robots controlled by an encrypted remote, this to allow, for example, driving to or in the warehouse. It may be possible to use an internal GPS or similar system; can be fitted on one or more sides to open and lockable facilities that allow the loading and unloading of the container 1 using a pallet truck or forklift; has sufficient protection against damage; for additional safety of its sensors, Lidar or other systems, possibly with scanners/lasers that detect collisions with people, animals and possible other obstructions and or roadway interruptions and prevent problems. A device can also be fitted to allow multiple containers to follow each other electronically and/or mechanically coupled. In warehouses and other locations, a special loading platform with ripe leaves can be present for these containers so that a heavy loading ramp is not needed.

The freight plateau can be carried out as follows: can be executed with all items of container 1 however, does not have the walls and roof of the container; may be carried out as a plateau in which or on facilities which can be attached to the means of shielding the cargo. These facilities may consist of any removable, retractable, movable, rotatable or other methods applicable to fencing, mesh constructions, plate constructions, sails, or nets or other forms for shielding; may have facilities that allow the loading or unloading of the freight plateau from all sides.

A second execution of a container (container 2).

This is a standard container without all the additions and can be offered in different versions and dimensions for transport.

The possibility exists to place complete containers in the unit space.

Can be chosen to place the container on one or on multiple pallets where the desired information about the container is stored via the Freight software control system in the pallet electronics and the positioning of the robots using that info Automatically done using sensors/cameras and or other measuring systems placed in the robots.

After this, the pallet robots in formation can move the container according to the usual concept.

It can also be selected for transport on the freight plateau.

The Pallet Robot

Has all applicable items that have the described containers: the robot is arranged in such a way that it can drive under pallets; that, when placed under the pallet to be transported, it takes such a form that the pallet can be lifted sufficiently, and optimum stability is ensured during the movement; to achieve this, the wheel elements and the supporting surface may be extended automatically; provision shall be made for facilities capable of catching bumps and interruptions in the plane; ensure that the wheels have sufficient grip on the various substrates; is made of suitable and authorized materials for the types of freight to be transported; suitable for automatic and manual cleaning. h) has a battery (or alternative storage device) for the required energy for the various items of the pallet robot; has a transmission and reception system for data transmission with the pallet and other system components and communication with freight software control system; storage and reading possibility of the data supplied by the Freight software control system concerning the pallet itself, the data possibly coming from the pallet itself, the current position and the position where the pallet must go, (this may be a place in he chain by means of the positioning system used by the system and any GPS or alternative system location indication), possibly data concerning the load, the origin, the destination and other relevant matters (possibly Encrypted in a code possible using blockchain technology; a preferably contactless charging option, possibly by means of a quick charger; a provision for the fast loading of a pallet battery from its own battery; a sensor, tag or other tool for precise positioning of the pallet to be loaded; a sensor, tag or other tool for precise positioning under the pallet to be loaded with a possibility of correction to the ideal position; sensors for protection against overloaded and wrong loading; energy-efficient electronics that only enters into force by a trigger signal through the unit or wagon or other source; a self-test system for electronics and accumulator or alternative energy storage item with automatic notification of error detection and any automatic maintenance, repair or replacement operations necessary; very powerful highly efficient via the software controllable drive with one or more suitable wheels; very powerful highly efficient via the software controllable lifting capability/plateau; automatic notification of deviations and or malfunctions are reported via the freight software control system which ensures the removal of these and that the scheduled assignments are carried out by another robot and that the in-fault robot to repair goes; the pallet robot has a fixed and limited field of work which makes programming relatively simple, however it can also be programmed for other fields of work by loading the data for this; the pallet robot is looking for controlled by the Freight software control system to independently set up the programmed pallet or other item and place it in the space reserved for the freight unit, possibly after the pallet robots in the relevant freight unit are automatically unloaded. The pallet will indicate any signals for the robot to be recognized and give a confirmation of the displacement to the Freight software control system; has a navigation system and a control system that can be automatically controlled by the freight software control system and performs its command with supporting information from the respective platform area, the relevant cargo space, the pallets present in those spaces and the other pallet robots operating there, and has a supply in the control system that takes into account all the present freight and other obstructions and at the same time the route and order of his command to be executed and align it with the route and timetables and execution of the commands that perform or will perform the other pallet robots operating in and on the respective platform area and loading space. The control and partial execution of the assignment can be carried out in part before the train reaches the stopping place. This can be passed on by the Freight software control system the desired information regarding arrival time, layout and load already at an earlier stage before the arrival of the train to the various items concerned; and example of a possible row and lift-part of the robot.

Practical Interpretation

On the basis of the problem objectives mentioned above, there must be a solid solution to the enormous quantity of freight to be transported, which should be considered for all disciplines within the entire process. Standardization is an important item in relation to the loading of freight units etc. A lot of transport material is the freight that are sold in the supermarkets. The heavier products such as bottles of soda and beer are often transported on the so-called beverage pallets with a ground surface of 1000×1200 mm. The other freight are transported much on pallets with a ground plane size of 800×1200 mm. For transport traffic by road, the Netherlands has a maximum width for lorries of 2550 mm. Exception to this is conditioned transport for this is 2600 mm. The size of the trains currently in use is at least 2600 mm. If we are Then two pallets of 1200 mm (=2400 mm) can be set in succession. Furthermore, huge quantities of lighter freight are transported in the pallet trucks. Often the base of the in-use versions is about 600×800 mm. If we now opt for a three-piece arrangement, we will also arrive at the 2400 mm. Because many freight need to be protected from pests and theft, we choose Transport according to the first execution of the container. In view of the weight, stability, agility and cost and handling, we are looking for an ideal sizing for six pallet trucks per container. These dimensions are well processed in the usual passages and warehouses and in the transport means. The problem theorem is now to develop the pallet robot so that it can be used for all three variants. This also requires an innovative pallet that is equipped with the previously named items. In addition, it should preferably be transported by one version of the pallet robot. Furthermore, it must be placed in the current positions in use and can also be transported by normal forklifts etc. That is why we are coming to the next innovation.

The materials can be a combination of, for example, stainless steel and plastic, or any other suitable material. Care is taken that the pallet normally does not cause damage to the substrate and that the surface is stiff enough so that freight do not move. Additional facilities and possible provisions to support packaging (pallet edges-clamping belts-covers etc.) may be affixed. In the plastic, any desired equipment previously described under the item Pallet shall be applied, which also ensures optimal protection. The carrier points of the pallets are chamfered at the places for the wheels so that the pallet robot can drive over it well. At the wheel openings, any material on the side of the pallet can be removed so that the wheels get a little more space to rotate. For this, we can provide a pallet robot with all the 6-wheel features previously described under the item pallet. The wheels are preferably all driven at the same time or separately, to generate maximum power and maneuverability. These wheels can possibly be developed with internal engine, resulting in a much larger torque and acceleration.

The corners of the pallet robot are carried out very robustly to protect the wheels. These angles can consist of a sturdy swivel cylinder that, when in unexpected contact with the pallet rim, presses the robot in the correct place. This is only as extra security. The exact positioning of the pallet robot under the pallet is controlled by on or in the pallet and the pallet robot a specially developed sensor and with electronics control such as a Sick 3D LIDAR sensors MRS1000 system or alternative Additional electronic steering wheel and navigation systems.

This allows for an exact placement under the pallet, possibly together with other sensors. By using the maximum dimensions under this pallet of 800×1200 mm we come out on a pallet robot size of about 750×1200 mm this size is wide enough for transporting the wider pallet of 1000×1200 mm.

All facilities for the purpose of the automated transport etc. As previously described under the item pallet are applied to or in this pallet, if applicable.

Pallet 1000×1200 mm (Bottle pallet).

By carrying the pallet edges at the wide pallet with rectangular tubular profiles, which equates the gap between the spacing of the narrower pallet (i.e. about 750 mm), we have a stable pallet that distributes the weight better on the ground plane.

Because the larger pallet is usually taxed much heavier, the various facilities can be integrated into the tube profiles. All desired facilities as defined by the pallet of 800×1200 mm are also applied in OS on this pallet, if applicable.

The pallet robot sequel.

The pallet robot has a relatively large surface which makes it possible to properly store components such as the battery or alternative energy storage unit and the electronics in it.

Due to this large surface, the facilities for the lifting of the pallet can be applied well distributed. This lifting can be carried out with electronically controlled devices with highly efficient engines, possibly in combination with or by hydraulic and or pneumatic systems.

Possible size approx. 750× approx. 1200× height.

Number of wheels and lifting points and dimensions may differ from drawing.

Possible execution.

The pallet robot is equipped with all previously defined properties and facilities as previously described.

Support/mounting frame for lifting cylinders.

Steerable wheels with internally highly efficient powerful and suitable motors or driven via a drive mechanism with one or more engines. Different types of engines can be used.

There can be developed both for powering and lifting special so-called Direct Drive Torque Motors. Together with good software and motor control programs and the right battery equipment, these provide reliable, highly efficient and fast pallet robots.

The wheels are positioned in such a way that they fall exactly in the fitted cutouts of the pallet brackets of the 800×1200 mm pallet. The relevant pallets as described above and the pallet robot described above can deviate from the defined concept as regards the dimensions, the execution and the location of, among other things, the openings and the drive and the number of wheels. As long as the objective remains the same.

Supporting frame for mounting other parts.

Hydraulic or other system for the pallet robot's lifting points.

Multiple sensors and electronics systems installed in suitable locations on the pallet robot.

Battery possibly consisting of multiple modules with sufficient capacity and charging system for possible wireless fast loading. These can be applied to multiple suitable places on the pallet robot Carry/lift platform equipped with a suitable top plate (lifting plate) and adjustable via items H and the electronics control systems.

Cylinders or other item suitable for performing the lifting and descent movement.

These can be in several places for example also between the wheels and can consist of hydraulically or electrically or mechanically propelled elements. Also, a controllable electric motor can be included per lift/descent element.

Alternative to the above description may be that the pallet robot is carried out with possibly suspension in height adjustable lifting cylinders at the place of the wheels. These lifting cylinders with the freely rotating round balls at the bottom are positioned in such a way that they fall exactly in the openings of the defined pallets. Also, can be selected for (extra) lift cylinders in other places. They are then increased electromechanically, hydraulically or pneumatically so that the lifting plate and the pallet are lifted to the desired height.

The drive for displacement can then be done by one or more engines and with one or more wheels located underneath the pallet robot.

Another possibility are Omni- or Mecanum Wheels or similar drive wheels (this does not require a lifting motion for driving in a different direction in connection with the wringing of the wheels to be made). The motors can be attached to one or more controllable rotatable plateaus, the position of which is controlled by one or more adjustable motors such as direct drive motors or other suitable engines, whether or not equipped with mechanical and or hydraulic or Pneumatic couplings, actuators or delays. The wheel pressure of the drive can possibly be arranged with an anti-skid arrangement that adjusts the height of the suspension lift cylinders if necessary so that more pressure on the drive wheels comes and less pressure on the bullets at the bottom of the lift cylinders. The above build-up of Drive-, lift motors etc., may be applied in adapted version for all self-propelled systems, robot pallets or containers, which can therefore be used with the following facilities.

For all the systems described, the height of the lifting cylinders can be reduced if necessary so that no or less pressure is exerted on the drive wheels and therefore can be easily rotated without damaging the drive wheels or the driving surface. This makes it possible to be driven directly in any direction you want.

Extra attention is required for the steering system. Often with pallet trucks etc. But by one wheel the drive is done, and the other wheels are carried as a buck wheel, one of which is a swivel wheel.

Also, steering is often done by putting one side of the drive stationary or running slower as is often done with a tracked vehicle. The stationary wheel is then often wringes which is overcome by using omni- or mecanum wheels or alternatives.

However, we want a very fast and maneuverable pallet robot, which requires other solutions. If the drive is chosen by the engine in the wheels, then we have stationary axles. We must then ensure that these axles have sufficient load capacity and can still move to rotate the wheels.

Also, this can be in different ways, all at once or per three at a time or per two at a time or all independently. This can be with, for example, a custom ball hinge or alternative fasteners. These wheel fasteners must also be able to carry the total weight. It can also be ensured that each wheel is provided with a kind of shock absorption separately to absorb irregularities in the vehicle's surface.

Also, the drive system must be such that the pallet robot remains straight if the controller gives the instruction, even if the wheels wear a bit or if the substrate is not completely flat. Therefore, the drive of both sides must be continuously verified with the navigation/positioning system and, if desired, be controlled.

The palette robot can be built in several ways with other methods to perform the various functions, as long as it is ensured that the defined dimensions and functions are fulfilled. The pallet robot may be equipped with all the above described items.

The very rapid operation of the system must be considered. The use of electronics and sensors makes this possible. The lifting plate of the pallet robot is tuned to the height of the pallet with spare space this in order not to run at risk of bumps et cetera.

An option is that the distance between the lifting plate of the pallet robot and the pallet is measured by the sensors. The lifting plate is then steered very quickly to almost against the pallet, after which it touches the pallet with a slower movement and the lifting with a possibly increased speed is carried out. This is also done in a fast, identically responsible manner.

Angled Faces

If a container or other item is moving down or up, the difference between the various ball-pot wheels or other wheels arises. This difference can be used to correct the cylinders so that the lifting plates remain horizontal and sufficient pressure on the drive wheels is ensured. This can also be with the help of sensor systems or level measuring systems that measure difference in height and then adjust the pressure in the various items to ensure stable progress.

Optionally, under the lifting plate, one or more items (plates) on which lifting cylinders or other lifting elements driven by engines that support the latter correction method can be corrected, allowing an even larger slope angle to be adjusted.

There must also be one or more security censors in the self-propelled unit and not self-propelled which will force a blockage/brake on the drive at a too large ramp angle a brake/blockade of the drive and or wheels to run possibly even Before wheels or rollers are located above this plane by scanning the plane before it. The sensitivity to slight irregularities can be preset.

The locations of the pallets and robots etc. are always recorded. A good distribution of the pallets is possible. Theft may be prevented. Also, the pallets and pallet trucks that are unloaded can be shipped in the most suitable way to the place where they are again desired. The system is adequately protected to prevent disruptions caused by theft or hacking.

Depending on the size and number of wagons and units, dozens of pallet robots can be ready or not with pallet in the right place on the platform before the conscious train comes to a halt exactly in the right place. A super-fast unloading and loading time is therefore possible. The discharged and loaded pallets can be used in various suitable ways as for example transport tires or by the pallet robots themselves, on the respective platform and discharged for further distribution.

The conveyor belt for transporting pallets is a well-known technique that is applied in many sectors. For example, an application is a powered rolling tape on a truck floor that is loaded (or discharged) with, for example, pallets with beer crates or another beverage. In principle, the conveyor belt is loaded with pallet trucks or other conveyor belts. It is also possible to load a full truck at one time using a huge plateau.

The automation is basically simple to perform often there are some drawbacks like a loading floor (rollers) that is not flat and has to be carried out quite heavily because weight during transport is on the conveyor rollers which can quickly lead to damage. Use for other forms of cargo is also often more difficult due to the floor-lying transport rollers.

Another problem is often the available space to use this system because it usually uses heavy conveyors and relatively heavy forklifts. However, under circumstances it can also contribute to quick loading.

In combination with the pallet robots, a high loading speed can be achieved for many products. The aforementioned container can in principle be automatically loaded quickly using the pallet robots. This also applies to other specific loads. Through the use of the pallet robots driven by the freight software control system, a wagon (or truck) can be quickly loaded or discharged on a relatively small platform space.

Ball pot wheel/lift cylinder drive.

Each self-propelled item can be executed with one or more ball-twisting or lifting cylinders used as support or as a drive. When used as a drive, the spring-loaded ball pot is replaced by additional motors and omni-, mecanum or similar drive wheels.

Train Compositions

The train can be assembled in such a way that during peak hours the train consists entirely or largely of passenger units and in the off hours from a combination of both assembled as needed.

In the night and possibly also during the daytime, trains can be built entirely with freight units.

The trains could be automated so that they can drive over the track with a much larger density. Also, can be selected for control from certain places or not in the appropriate train and work with cameras etc.

It is also possible to choose for longer compositions of trains consisting of the normal passenger wagons in combination with unit wagons and/or full freight wagons, thereby accepting that the passenger wagons are not always optimally filled. The entire freight wagons have the same characteristics as the unit wagons, however, may be distributed differently or variably divided into units allowing a different load which is then automatically scheduled to be planned to use the Freight software control system. The classification can be done without physical separation and is optionally electronically separable in units if desired of different dimensions which then again with the help of the Freight software control system to the various items concerned automatically can be programmed.

The structure can also consist of several floors so that a much larger handling of freight can take place on adapted platforms.

Also, can be chosen for trains that drive electronically coupled. The unit wagons or complete freight wagons can automatically stop at a certain distance from the passenger wagons on a part of the track which is suitable for the fast handling of freight.

After this handling of freight, this part of the train is again coupled with the passenger cars to the next destination so that the load on the railways remains just minimal.

Coupling of trains and wagons. The development and implementation of the concept depends on a number of factors. Some factors are the current infrastructure with buildings and facilities such as rail systems and safety systems such as the ERTMS system.

Depending on the circumstances and progress of the development of the system, it may be a reason to build up trainset with the different types of wagon versions described, where appropriate the freight section at a certain distance from the passenger section remains. This is to be arranged by moving train parts at an electronically controlled distance relative to each other.

This may, for example, be on arrival at a station or other location that the freight section is detached from the passenger section and that both parts at a predetermined distance relative to each other and in relation to any platforms to the entry and exit and unloading and loading procedures are carried out. After this, both parts leave the freight section again electronically and possibly mechanically coupled. By taking this coupling in the safety and other systems, the combination can be seen as a single train set allowing a much higher train density to be realized.

Instead of the electronic coupling system for distance between passenger and freight wagons may also be chosen by adding a number of wagon subways hereinafter referred to as coupling wagons between the passengers and freight section. Since most railcars drive fixed routes depends on the situation on that route to insert a certain length of coupling wagons. These wagons can be performed with a number of properties, such as low weight, low cost and facilities to reduce the air resistance of the total trainset as much as possible.

Depending on the developments, the above can make a huge contribution to the optimal use of the rail infrastructure. Continuity is an increasingly important factor in this.

One can also opt for the start-up of this concept by supplementing current trains with freight wagons which, according to this principle, work to expand capacities in freight transport and simplify the integration of the system into the current Network system.

Also, light freight trains, i.e. without passenger transport facilities, which run at the same speed as passenger trains, can be used to create tremendous capacity and flexibility.

In the double-decker trains one can also choose to fill a part of the train with units, for example the lower part between the wheels of the bottom part. In and out and loading and unloading could happen on different sides of the train.

You can also add Special Unit wagons to these trains to enable quick transport on intercity routes.

A further possible optimization can be that the train on one side has the passengers in and exit facilities and on the other side the facilities for the freight units.

The choice can also be made to load and unload the wagons of two sides simultaneously, to allow even shorter stop times. It can even be chosen to provide the wagon on one full length side with or non-interchangeable passenger units and the other side of or non-interchangeable freight units. Another choice may be to set up part of the wagons with or without interchangeable unit units where one or two sides can step in and out in combination with wagons arranged with or without interchangeable freight units loaded on one or two sides or can be unloaded.

There is also the possibility to move freight directly from wagon to wagon using two or more adjacent railcars, possibly with the use of platforms and pallet robots.

Stations must be made suitable for this purpose, requiring safety and efficiency and various facilities in and on the platforms and transport means and temporary storage facilities and the facilities for the Freight software control system.

Rail systems may also need to be optimized and suitable preferably covered marshalling/transshipment sites. These could, for example, be optimally used to transport huge quantities of pallets and other cargo and to deliver the cargo from producers and distribution centers.

In this case, several trains with on both sides of each train platforms can be positioned along each other and freight may be moved through the trains. Other facilities such as controllable bridges or pallet/container escalators/elevators with corridors to and from other trains provide unprecedented logistical possibilities.

Rail systems may also be optimized, and suitable shunting/transshipment sites are constructed.

For example, these could be optimally used at night to transport huge quantities of pallets and other freight.

Furthermore, the system should be extended with automated distribution systems with producers, distributors, carriers and parcel services and customers.

It must also be able to respond to the occurrence of incidents. This could be for example by providing additional storage and transshipment capacity in strategic places.

Benefits are achieved in terms of cost, efficiency and environment, if freight are delivered directly from manufacturer to a supermarket, for example, without First to distribution centers of the supermarket chain how to go. Due to the high frequency and speed of trans-sports according to this method, very many freight are eligible for this.

In supermarkets there is a lot of work with a certain type of carts. These carts are suitable for transport in the shopping gangways. Pallets are also used. By placing these with a number at the same time in a closed special self-propelled container, we can organize a quick delivery by automated handling between different trains etc. The advantage of this is that in the supermarket in question there is not a huge number of pallets and carts that are blocked by the large number of efficient processing because it is overcrowded.

Furthermore, freight that are used in less large quantities and volumes can be delivered in the self-propelled containers in the most suitable grocery store. Here the items for that location are taken out and optionally supplemented with other freight and forwarded to the next store.

the Parcel Services.

The many parcel services can work much more efficiently with the solutions of the concept.

Automated very fast transport with high frequency to the 400 drives gives many advantages. The freight arrive in the area where they are destined for. Further distribution is treated later. Shifts in personnel due to the automations in these sectors can also provide a solution to the increasingly difficult to fill vacancies in this sector.

Distribution Chain

For the further transport of the transported or the freight to be transported, a number of facilities are needed to transport them to the final destination as efficiently as possible. Many possibilities are available for this.

Producers can carry freight in or on the appropriate items with the read-through data to loading centers for trains. Since the locations are not in the urban centers, a number of options can be viewed, depending on the location of the railway lines.

Platforms and stations may need to be rebuilt and equipped with lanes for self-propelled items and or other transport systems such as conveyor belts, chain systems or many other possibilities.

Depending on the situation, the most optimal can be chosen. The big advantage is that each item to be transported is provided with all the specific data as destination etc. and can communicate about this which makes automating much easier. Relatively small distribution areas with possible storage spaces should be available for a short time.

In these spaces, the freight are automatically loaded by pallet robots and or the self-propelled items independently enter the appropriate "bucket", this is controlled using the "Freight software control system" and by automatic mutual Data transfer related to destination and similar and indoor navigation systems.

The "bucket" is a loading box that can be placed or placed on a preferably electric truck or trailer. These bins and lorries and trailers are automatically given the data concerning loading and destination by mutual automatic data exchange and planning etc. with support of the "Freight software control system".

After that, the bucket is delivered to the destination according to planning. This can be a specific destination being a company or other delivery address but this can also be one of the many to set up loads and unloading places at for example a shopping center or supermarket where the bucket preferably super-fast, also again controlled by the "Software control System", can be unloaded automatically and possibly loaded. Unloading and loading in other ways might also be possible but cause delays. A cheaper and faster feasible alternative is the later defined (semi-) self-propelled trailer. Furthermore, stations can be located in or in the vicinity of shopping centers or at Schiphol. The freight can be moved to one or more warehouses in the self-propelled containers or in other ways. Often this will be carried out with a number of linked items pulled by a suitable vehicle or through conveyor belts or other possibilities.

The same is true for delivery of freight to shops and or companies that are often located in or near stations, even here direct delivery can be carried out.

Shopping Centers

The Netherlands has many shopping malls, squares and streets with shops, each with its own warehouse. A few things such as monitoring, parking and accessibility are dealt with in consultation between the various stakeholders.

A possible development could be that the warehouses and freight receiving, and reception and disposal of waste would also be combined. The advantage is that freight can also be delivered centrally outside the opening hours, this with minimal commitment of staff. Further benefits such as the joint use of unloading and loading sites with associated resources, skilled warehouse personnel, more efficient storage and maintenance are matters that should be thought about.

Due to the supply with the coded carriers and possibly coded packaging, a good and better logistic handling is excellent. Notification of receipt of shipments can be done automated. Another possible advantage could be that central warehouses can increase the available shopping area.

The Truck

For delivery You can choose small, possibly self-propelled, preferably electric multifunctional cargo carts but also for other solutions. Wagon for bucket and parcel delivery is preferably electrically powered and equipped with a battery with a fast charging system, may be self-propelled, may be paired with other trucks that follow the first via an electronic torque tracking system, is executed so that it can drive over bus lanes etc., has good facilities for communication and control by the freight software control system, may be equipped with a changing system for different trays, can be fitted with a loading box equipped with an automatically controlled carousel/Paternoster cabinet, can be carried out with a freight bucket such as pallets and containers, can be carried out of an automatic parking system for accurately in the right place parking for unloading and loading and changing of loading bins, The freight wagons to be used shall preferably be loaded from the side, in order to have a loose and loading capacity as quickly and efficiently as possible. The most optimal load is automatically controlled by the Freight software control system, can be carried out with one or more roller doors and or other door(s) and a row and/or tail lift, can be carried out with an automatic height adjustment of the loading box compared to the unloading and or loading location, can be performed from sensors or other navigational tools for the pallet robots, may have been performed with a feature that allows lateral displacement, to allow movement in or between confined spaces, can be performed with calibration sensors and systems to align precise positioning with the pallet robots or other items by automatic correction of the data used for the navigation and driving route of the various items.

The pallet robot or other items also have a fixed and restricted field of activity, which makes programming relatively simple, but can also be programmed for other areas of work by loading the data for this purpose.

The pallet robot shall independently search for the programmed pallet or other item and place it in the space reserved for it in the bin or on the loading or unloading site, possibly after the pallet robots have the potential for that destination in the appropriate bin or load or Unloading pallets are automatically unloaded. The pallet will indicate any signals for the robot to be recognized and give a confirmation of the displacement to the Freight software control system.

A navigation system and a control system that can be automatically controlled by the Freight software control system and performs its command with supporting information from the respective loading or unloading area, the Concerning loading space, the pallets present in those spaces and the other pallet robots operating there, and has a supply in the control system which takes into account all the present freight and other obstacles and at the same time the route and Order of his command to be executed and align it with the route and timetables and execution of the commands that perform or will perform the other pallet robots operating in and on the respective unloading or loading area and loading space.

The other self-propelled items are automatically sent in a similar way, considering the activities of other items and their work.

The container 1 carried out for transporting, for example, 6 pallet trucks (pallet wagon stand and or pallet truck robot) is provided with sturdy support surfaces and profiles at the right distance (about 750 mm idem as with the other pallets).

In this way, two electronically coupled pallet robots of approximately 750×1200 mmin fit the longitudinal direction in succession under the Container1 and the container1 can be transported properly.

The gutters (or other forms of conductors, for example, a raised edge or any interchangeable angle strip for the carts) should not be allowed to hatch or as little as possible under the container and should not be in the way for the carriers Also, in this container 1 the frequently used carts of 400×600 mm can be driven by changing the two fixed wheels of the cart into ball pot wheels or replacing them with castor wheels that are blocked by default like the current wheels, however, that these When driving in the Container1 are automatically unloaded. Another possibility is to apply extra rail (guides) especially for these carts. Of course, this can also be for other sizes.

The floor of the freight units and of lorries can be equipped with sturdy profiles (or other elements) at exactly the right place as a guarantee against shifting of pallets or containers. The ends can be slightly curved, this to have a less critical opening.

These facilities must be positioned and implemented in such a way that they do not hinder the pallet robots and when loading with other size pallets or containers. The profiles could also get up from the floor at the right distance, controlled by the pallet robot and or other system component.

In addition, facilities such as sensors or other items can be placed as a tool for the precise positioning of the pallet robots and pallets.

The trucks to be used are, as with the freight unit of the train, preferably loaded from the side, this to have a loose and loading possibility as fast as possible. The most optimal load is automatically controlled by the Freight software control system.

In addition to the Container1 for the carriage of 6 pallet trucks (may be, if desired, a smaller number), these can also be shorter for smaller shipments for the transport of two, three or four pallet wagons, where the width remains the same and the Floor area is sufficiently large, in relation to stability.

The smaller containers must consider the length of the roller door (or tail lift), and the pallet wagons must be secured.

Self-Propelled Containers

Important; both the pallet robot, the Container1 and Container2 (and possibly other containers) and the freight plateau and possibly other self-propelled items can be provided with the functions facilities such as the lifting cylinders with bullets of the Pallet robots by integrating them, the lifting points may then be dropped and the drive is taken over by some of the wheels which may be more spaced and not placed under the container.

Furthermore, more extensive software and electronics must be installed because the container has to move across multiple areas such as different platforms and possibly via different unloading and loading locations and in different warehouses. This can be by developing the software and drivers in such a way that they are automatically adjusted directly via the location itself and/or by the Freight software control system to the location to be used. Also, the battery and charging systems/places in and for the container must be adjusted accordingly. The safety functions during moving must also be adjusted accordingly. Modifications can also be made to the container so that normal 800×1200 and 1000×1200 pallets and other items can be transported. However, it is necessary to consider the placement of the self-propelled systems that they are not enclosed by other freight and if it does happen that when moving it first the road must be made clear by a pallet robot.

The big advantage is that speed is gained when loading and unloading and moving the containers on platforms and in loading areas and to and in the other locations is simpler and that less space on the platforms and in the warehouses is desired. Disadvantage is that the cost of the containers will be higher, however, fewer pallet robots may be needed.

Any transport means such as pallets, containers and pallet robots etc. are provided with an item that allows location provision using GPS or alternative means of communication and traceability in connection with transport planning and or theft.

Each self-propelled device could be equipped with a possibility to connect it to each other and to a trailer so that they can be transported in a kind of train formation. It could be chosen to disconnect the wheels for the drive of all items to be drawn from the engines or to turn off the engines and, if desired, to charge the battery via a charging system.

When fitting the coupling facilities, it must be attempted not to be outside the original dimensions of the item. The coupling device may also be used again to fix the relevant item in the various transport means such as trains and lorries.

The following applies to each loading and unloading or other location where self-propelled items are used. A self-propelled item may have security systems to prevent collision or other problems including theft-occurring resources, a navigation system and a control system that can be automatically controlled by the Freight software control system and carry out its contract with supporting information from the relevant platform or work area, the relevant loading area, the pallets present in those spaces and the other Pallet robots, and has a supply in the control system that takes into account all the present freight and other obstructions and at the same time calculates the route and order of its assignment to be carried out and aligns it with the route and timetables and Execution of the commands that perform or will perform the other pallet robots operating in and on the respective platform area and loading space. The control and partial execution of the assignment can be carried out in part before the train reaches the stopping place. This can be passed through the Freight software control system Information regarding arrival time, layout and cargo already at an earlier stage before the arrival of the train to the various items involved.

Parcel Delivery Wagon (Carriage A)

Carried out with one or more possible interchangeable bins.

More and more supermarkets are often delivering their products at home. By now also delivering the parcel post of the various parcel delivery companies here (this one by train and per pallet etc.) you can, for example, be delivered daily in a single delivery. Now a parcel delivery is about 1 to 2 km per parcel, this is then reduced to about 100 meters per package.

Carriage A is a possible version with one or more automatic carousel cabinets (horizontal or vertically rotatable storage) or Paternoster cabinets (vertical carousel) for parcel delivery of all packages of all the different Parcel delivery services together plus delivery for supermarket and other freight to be delivered.

The bucket A could be narrower than freight transport bin B because this bucket often has to be driven by narrower streets. The driver's room could be carried out in such a way that the drivers can get off on both sides and that are placed in these space cabinets for the often smaller packets. These cabinets can be provided with an information screen or an automatic opening door if the address is reached where the parcel has to be delivered. Along and or under the seat could be place for larger packages. The door could automatically open by approaching the driver or by a signal from him (possibly speech recognition)

In connection with the safety, it can be chosen to situate the opening for the elimination of the packages at the rear.

For loading it can provide an advantage that a number of doors at a working height are open at the same time and whether when scanning a package the relevant box is opened or denoted by an indicator or that on a screen the information of the load package is shown so that they can be loaded on a sequence prescribed by the software control system which has the most optimal delivery route for this.

It can provide the laden benefits if the bucket is made up of two or more parts that can be moved so that multiple sides can be loaded. For example, one side of the cabinets could be open and that it will be closed automatically by merging the baking parts.

For additional control to avoid errors, a scanner or other system could be present in the box that recognizes the freight when placing it and gives an error signal. Undeliverable packages could be replaced in the box where it comes out or in a separate storage room. After the route on return in the loading area, these can be automatically reported and rescheduled.

As an alternative to the above loading methods, you can also choose to load freight via one or more loading or unloading counters where the product is scanned or recognized by another software system read/recognition system. (The freight to be loaded could already be stored in the truck software system by means of the freight software control system, which may have been taken into account with delivery arrangements) after which it is linked to the relevant box of the Carousel Cabinets or other location boxes and the most optimal delivery route. One can also choose to work with electronic indication means on the freight in which the reading of the resources can be done faster and more efficiently.

The electronic indication means on the freight to be delivered, in order to optimize the recognition, sorting and further processing, may have a supply, which responds with an acoustic and or optical and or other indicative signal, to a specific broadcast recognition signal sent by a transmitter controlled by the freight software control system. The required energy for the indicator could come from the indicator or by energy from the wireless signal for recognition or other radiation/transmit source. In connection with fast loading, multiple counters of the carousel cabinets may be available simultaneously.

By using a paging system for baking the truck can be practically continuously deployable and baking can be loaded while other packages etc. are delivered to the house.

For the above, a special or non-electric truck optimized for these types of orders can be used.

This delivery car could work with the help of the Freight software control system and a navigation/loading program that generates the optimal order a route for loading and delivering all the freight to be loaded, and possibly one or more Carousel or other cabinet drawer systems that automatically offers the package in the correct order in a counter to the driver/delivery operator, for example, at the rear of the car or the most secure side of the car.

A provision can be used that makes traffic aware that the vehicle has stopped and is busy with parcel delivery.

A provision can be used to indicate the supplier and the transporter of each subsequent shipment to be delivered.

A provision can be used to provide a time to determine the delivery address automatically sends a message to the consignee sent by the truck electronics with an indicative time of arrival. This ensures that an episode can be done faster because the receiver is already ready to take delivery of the freight and it increases safety by preventing a carrier from doing this themselves under driving.

Under between the wheels can be storage for parcel delivery of e.g. supermarket products. These products can be placed in special crates or boxes, possibly with electronic programmable and or readable data carriers and then pushed into the appropriate cabinets between the wheels or other places. When placing between the wheels, a kind of duct with a move or sliding system could be used that makes it possible to move packets through this tube to the other side of the car. A loading order could be used in such a way that the unloading can be unloaded in the correct order on the safe side of the vehicle. For any return, these crates or boxes could be foldable. The electronics present in these crates or boxes could automatically give notifications of delivery or return, possibly using the freight software control system or other systems. In addition to the truck and or cab, facilities can be fitted for larger and or longer packages.

The truck for delivery will receive codes using the Freight software control system and or of all containers or pallets or other items supplied on the site of DHL Post NL etc. and of any supermarket or other clients. The system ensures optimal planning for optimal driving and delivery routes or by other assigned route schedules for example due to delivery time obligations. The unplanned freight are scheduled in another delivery or other carousel box for delivery at another time or by another truck. The Carrousel carriage soft and hardware systems must receive and edit the data, possibly using the freight software control system and, if necessary, give this data through the Freight software control system the planned route for the freight Delivery to the system of the truck that will charge or load this carousel tray and then deliver it. This is a very fast delivery method, theft prevention and a safer work situation. Also, it gives protection of the freight in bad weather. The vans can also be equipped with a paged bucket so that a very high efficiency can be realized in episodes.

Delivery notification can be done via electronic devices in the ordering car via the freight software control system or via the current used systems whereby the notification is made to the Freight software control system.

Furthermore, this system offers a solution for a contemporary and more attentive questioning problem namely the emergence of a kind of contact/control possibility of the delivery operator and the citizens, this because by the shorter daily route preferably carried out by the same person, a better familiarity between delivery guy and customer arises.

Carriage for Freight Transport (Bak B)

Possibly the same truck but now with a wider bucket B with tail lift-ripe for transporting pallets and containers from the station to the various loading and unloading places. This bucket could be carried out at maximum permissible width so that there is room to be able to place two pallets of 1200 mm or a container that is self-propelled or not. A practical implementation could be a cargo compartment suitable for 6 or 8 Euro pallets of 800×1200 m. For loading, one could choose that it can be loaded via the sides and or through the back of the container.

The loading and unloading of the transport container can be done in the same way as described on the train with freight units. However, a supply shall be made by means of automatic support (or other facilities) automatically at the correct height, which prevents elevation in the loading floor as a result of loading or discharging.

The bin automatically receives data on load of cargo and the freight software control system. The truck gets these from the bin to be loaded and the Freight software control system In practice it will probably be more practical to load only the bin A with Carousel and then put on the truck and bake B empty on the truck and then load the pallets etc., because of the weight. You can of course also use trucks with the non-interchangeable bins.

Passengers/Freight Bus.

Most buses now run for most of the time with only a few passengers around. The use of people and material are very costly, inefficient and for the driver it is possible frustrating to drive around.

Therefore, one or more exchange parts for passenger transport during peak hours and a freight part can be thought of during the larger number of off hours, where loading etc. is carried out very quickly, as described for the trucks.

The (Semi-) Self-Propelled Trailer

The (semi-) self-propelled trailer consists of a chassis suitable for the public road which can be transported with a (preferably) automatic coupling system behind a lorry, bus, tram or other suitable vehicle. By giving a signal of a vehicle on a special "coupling site", the trailer drives itself to the vehicle in question and the coupling is carried out using sensors and other devices. Transport is carried out behind a bus, truck, tram or other vehicle.

When coupling behind a tram, one or more wheels suitable for riding on or in tramrails with sufficient pressure can be printed automatically in or on the Tramrail, so that the trailer will follow the tram in the right way, even if several Trailers are coupled in succession. The wheels for driving along the normal road can be detached from the road. The exact placement of the wheels on the tramrail can be arranged in different ways. There may be several reference points in, between or near the tramrails where the navigation systems with sensors on the front and/or rear of the (semi-) self-propelled trailer can be focused. When the correct position is reached, the wheels suitable for the rail can move downwards where the movement can be adjusted with electronic detectors that measure the exact position of the metal rail. Control systems can possibly provide certainty with the use of resistor measurements or other measurements on the exact placement of all wheels. After this you can follow the link with the conscious tram.

When the destination can be reached by the freight software control system (possibly at a tram stop) after the full stop of the tram a disconnect signal is given, which makes the (semi-) Self-propelled trailer is disconnected and the wheels in front of the rails are mounted so that the (semi-) self-propelled trailer is again on the normal wheels and can start executing its command. Communication with any tram driver may be necessary or possible.

This must of course be secured with the necessary safety features both during driving, mounting and against hacking etc. which is well possible with the current techniques. When the destination is reached, the trailer can be driven to the desired location by a given command, either independently or by means of a remote control or by a suitable feeding harness. This can be a warehouse for a supermarket, for example, after which it can be loaded and discharged. Also, here the data transfer is completely automatically steered and by the items as much as possible interchangeably with the help of the Freight software control system passed on. So also, the (semi-) self-propelled trailer receives, stores and passes all relevant data about itself and the freight to the other items concerned.

The trailer can be suitable for transporting all self-propelled and non-self-propelled items and can have their own enclosed container or a recording for one or more of the previously described bins. For example, a station can be a separate and loading place where these trailers are parked themselves after decoupling and controlled, loaded or discharged by the freight software control system. The wireless charging facilities of the battery can also be placed in the most suitable place.

The trailers can also drive to the unloading and loading dock at the trains to allow for a more efficient discharge and loading.

The (semi-) self-propelled trailer has a number of advantages.

An important part of this is that it is connected to the public road behind another suitable vehicle and is moved as a normal trailer (possibly with several in succession). In places suitable for the tramway rails can be created separately and loading locations which are suitable for the automatic loading and unloading of the (semi-) self-propelled trailer and or a non-self-propelled trailer behind the tram and whether a tram set or part thereof, carried out as a freight unit, make possible.

One possibility is to place these loose and loading places preferably covered and with facilities against pollution and weather influences such as grilles, heating etc., possibly driving or movable with the possibility to adjust the height to the loading floor with Possible maturity of the transport means to be loaded and unloaded and the desired height of the location in such a way that the items can be safely and properly moved in the desired manner.

Another possibility may consist of a valve mounted on the side of the vehicle where the tail lift can be stored in the vehicle, if not in use, under the car or stand-up against it.

An alternative is to use the entire floor or part of it as a tail lift.

The above items can also be applied to all previous transport means if desired. Additional support for the stability of loading or unloading may be necessary, which is soluble by the sliding of supporting supports.

Furthermore, the (semi-) self-propelled trailer only operates independently on previously equipped places with adjusted speeds, which makes the necessary safety, navigation and smaller battery systems relatively simple. The use of these trailers simplifies the overall implementation of the distribution system because less requirements need to be placed on the unloading and loading areas.

Many of the current existing facilities in supermarkets and shopping centers can be adapted without major alterations, which gives enormous cost savings and integration of the overall concept a lot simpler Makes.

At stations is often limited space. Here, the trailers provide additional throughput capacity by allowing them to be parked at a cheaper location in the vicinity of the station by loading or discharging them on demand and then parking again pending the freight Software control system provided commands gives this much extra capacity. This seems complex but by supporting the software with local subsystems this is well soluble.

A possible load of the bucket of a lorry or trailer can consist of three closed containers, whether or not self-propelled, each loaded with six carts or two pallets or other combinations. Because there are many possibilities to transport the trailers practically free, think of the many often empty buses and trams, this gives unprecedented advantages. Multiple coupled trailers behind a small truck is also a possibility.

The inclusion of a device in the chassis can possibly be driven by several trailers at the same time behind a tram or other rail vehicle. The possibilities and techniques for this are relatively simple.

A further advantage is that a lot more can be worked with cheaper non self-propelled containers that can be loaded automatically into the trailer trays with pallet robots. In supermarkets, they can be unloaded and loaded manually or by means of a pallet truck.

There is also the possibility to unload a part of the cargo, to charge the return and then to take the trailer back to the next destination. Flexibility, low investment costs and security are important issues for the feasibility and integration of the concept.

A contemporary big problem is that the many buses and other modes of transport such as trams, subways and the like are occupied only during peak hours and almost empty for a large part of the day. There are millions invested in many bus lanes. Let us also take this into full use.

By deploying buses that also have the possibility to provide an interchangeable part of the bus and or with a trailer these bins and or self-propelled containers, they also get a much better utilization. The loading and unloading can then be done fully automatically, as well as on the train, whereby some special facilities must or can be affected. A special loading and unloading warehouse can be made for the supermarket and or several shops, in combination with a bus stop, where the bus stops exactly in the right place. The loading or unloading can be performed automatically while the passengers can step in and or out after which the bus can continue to drive without additional delays. This same can be done in principle with any other form of (public) transport.

Applicability

In principle the system or parts of the system can be applied in very many areas in the world. Any transport system that uses rails or other conduction systems can in principle be adapted to the use of the defined concept as long as there are possibilities to make loading and unloading leaks with sufficient AF and supply possibilities. The globally widespread metro systems have almost all to do with peak and off hours. By making use of the concept, the increasingly difficult delivery of freight within these areas can be solved to a large extent.

Summary

The complete concept is a succession of technical innovative methods and developments to bring this engine of the economy that is currently fully in danger of getting back to a technical level that fits the developments in technology and will start functioning as it should.

The concept or parts thereof is in principle usable for the optimization of any transport system that uses rail-guides or similar carriers such as trains, trams and subways or of alternative possibly Electronic control systems, wherever the described components such as platforms, unloading and loading areas, etc., can be adapted or created, thus making arrangements that ensure that sufficient supply and discharge of People and freight is possible. Adjustments in dimensions and designs are of course possible.

Integration

The setting up of such a concept is a complex one especially because it needs to be adapted to a continuously in-use system. It is necessary to clarify where the test phase can best be set up. The components can then be adapted/produced. A good opportunity is to make a start with the self-propelled container1. Logistics can begin to process such containers manually and by doing so, optimizing the execution form. The unloading and loading speed can be performed faster with these self-propelled systems than with the non-self-propelled items. After optimizing and integrating this form of transport, it can already be made to a large extent via rail transport instead of through road transport. The experiences and structure created make the further rollout of the concept a lot simpler.

A further contribution to the optimization of the passenger and freight transport can be realized by working with good reservation systems. An important part is reservation on as long as possible time ahead. This can be by giving discounts on tariffs and if the reservation is not used a penalty system will be filled with a time aspect associated with it. This should not be daunting by high costs but rather encouraging to make a reservation so that the capacity can be adjusted accordingly.

For passengers, an app or alternative means could be used to make the reservation on busy routes and or at peak hours. Modification of the reservation must have a cost associated with a timeline. Here too, the fines should not be too high. They must encourage them to make conscious use of the transport opportunities and not to work frightening. Also, for students the OV card has to be adjusted. There should also be a small fine system for non-bookings. At 100% proper use throughout the year, the cost should be almost to zero and thus offer great advantages over the current system.

The earning model should be more based on freight transport. Travelling by train should be much cheaper for everyone, so that many more people are going to use the train, which gives great positive effects on the environment, because then the amount of car traffic is limited, so the rest is reduced by much less A much more energy efficient way to drive. Preference is for everyone a similar OV card as for students, however, with a slightly higher cost level tied to a reservation reward system using a good app or other system. Access to the reserved place could be by means of an electronic or other possibility that one could obtain by booking. If a reserved place is occupied, it can be performed by hired staff, to avoid annoyance and delay. For this, passengers who have not booked can check which places are still available and can claim them. On the wagons the availability of the places can be indicated by electronic indications. By doing this well there is much less chaos on the platforms and can be done in and out much quicker as everyone knows exactly where to get in beforehand. Any delays and consequences could also be indicated via the app. This creates peace among the passengers, which can benefit efficiency again. In real cases of force majeure, passengers should/can make use of via the app or other means and on the train indicated and or seated places. These can be located throughout the train and are therefore also in passenger units and possibly forced into freight units where any auxiliary equipment varying from pipes and/or belts to any of the ceiling or other place coming collapsible or Automatically inflated seats are available. This enables the carrier to solve the consequences of incidents quickly and well organized. By creating a good system for this, the non-executable reservations of the passengers can be automatically converted to new reservations as soon as the calamity is dissolved or is going to be and there any capacities of continuation Travel with you, possibly again by taking advantage of possible pitches as well. This gives the passenger peace of mind and can better organize his trip for the coming time with regard to food and takeoff and the like.

Addition to Wagon for Parcel Delivery.

The Carousel cabinet can be constructed in such a way that the size of boxes can be automatically optimally adapted to the (pre) offered package data.

Dimensions of the packages can be linked to encodings and the optimal cabinet dimensions are determined by this.

Alternatively, the driver, delivery operator or loader will scan or determine the size and automatically adjust the cabinet format as optimally as possible.

The contents of the Carousel cabinet or cabinets are automatically linked to all other package information to load or load and to the available space for packages as described in the cabinets or compartments or in other places on or at the Delivery vehicle and then the information is processed for the optimal delivery route.

The parcel delivery wagon can be equipped with a lift platform that ensures that the driver/deliverer can safely pack parcels from higher parts of the car. This can also be performed or supplemented by a staircase or ladder and or a running board construction or a reject construction or other tools such as extendable carriers in or to the carousel cabinet that ensures that the package is offered at an appropriate height or can be taken out or placed.

The wagon for parcel delivery can be equipped with a possibility to move perpendicular to the direction of travel, this in connection with the often in relation to the car small parking possibilities. This can be realized using mecanum or omni wheels or alternatives or by being able to run all the wheels adequately.

The Carousel cabinet or cabinets can be placed in a higher position where the space can be used for the larger packages.

To enable optimal delivery, parcels of different delivery services can be brought together at joint sorting centers and then sorted according to the criteria below.

The carousel tray is loaded in the most optimal way. In addition, packages that can be placed in another part of the vehicle for parcel delivery are placed in one or more transport facilities, considering the total available space and dimensions, weights and other packages and the available space. Also, a distribution can be made over or in the transport facilities that ensures the most efficient loading possibility of the car for parcel delivery.

The packages are always held in the most optimal space in terms of size and weight or other criteria.

If a size is no longer available, it can be placed in a larger place or in a residual position where it can be fitted with a position indicator for the delivery car or the package is installed at a later Loaded at a place that is still available.

The carousel cabinet can also be imaginary where the packets are loaded into separate sorting carts by size, weight or other criteria.

For urgent shipments, it can be calculated whether they can be taken into the standard cargo and delivery route where the delivery route can be adjusted if necessary.

If this is not possible then the emergency package is planned and processed in a different way.

In the case of too large or too small a supply of freight can be worked with possibly overlapping delivery areas of the parcel delivery vans, whereby an optimal result can be achieved by merging or spreading.

To optimize this, a quantity of packages can be pre-selected in the sorting process in order to determine the optimal loading method beforehand.

During or after loading, the software is linked to the carousel tray and the transport facilities with the rest packages and to the software freight system, after which they are shipped and are loaded when the destination is reached according to the pre Certain criteria on the package delivery vehicle available for this purpose.

The carousel cabinet can be loaded at various locations such as postal sorting centers and whether or not combined with smaller and larger packages in transport facilities are sent by train or truck or other Transport possibility after which, as described above, the processing can be further handled.

The (semi-) self-propelled trailer can drive independently to the unloading and loading place after the decoupling and position itself in such a way that this position is suitable for fast loading and/or unloading at that position and may automatically provide support that loading and/or unloading by moving the load means that the trailer remains stable enough for loading and unloading under all relevant conditions.

Navigation and or conduction systems with the accompanying tools can be used for positioning.

The (semi-) self-propelled trailer can be carried out for freight transport, passenger transport and or a combination of both of which the trailer is equipped with removable interior or collapsible interior as with the train wagons described.

Each self-propelled item can be equipped with options to control, if necessary or desired, with remote controls or Apps' on appropriate items, to change or remove or add functions.

It should be noted that the above-mentioned implementing forms illustrate the invention rather than limiting it and that an expert in the profession will be able to design many alternative forms of execution without deviating from the scope of the Attached conclusions. The use of the verb "include" and the associated conjugations do not exclude the presence of elements or steps not mentioned in a claim. The term "and/or" includes all combinations of one or more of the corresponding items listed. The article "a" preceding an element does not exclude the presence of some such elements. The article "the" preceding an element does not exclude the presence of some such elements. In The provisioning conclusion that enumerates different resources, several of these resources can be embodied by one and the same piece of hardware. The mere fact that certain measures are being recited in different dependent claims does not mean that a combination of these measures cannot be used.

The invention claimed is:

1. A method for the flexible transport of passengers and freight using at least one transport and a traffic infrastructure, the at least one transport including interchangeable passenger and freight units, wherein a determination to transport at least one of passengers and freight is performed by a coordination system comprising a calculation unit, a memory unit and a communication unit, wherein the method, performed by the coordination system, comprises the steps of:

recording passenger transport demand determined by a number of passengers to make use of passenger transport in a predetermined location during a predetermined time period;

registering freight transport demand from a logistical system configured to communicate a freight transport demand to the communication unit of the coordination system, the freight transport demand determined by a size of freight to be transported from the predetermined location during or around the predetermined time period, the size of the freight determined by at least one of volume, size and shape of the freight;

retrieving from the memory unit, which comprises a database containing data related to the at least one transport, a passenger capacity of the at least one transport present or expected to be at the predetermined location during the predetermined time period, the passenger capacity determined by a number of spots available in a passenger carriage of the at least one transport;

retrieving from the database, an expandable freight capacity of the at least one transport, the expandable freight capacity determined by a size of space capable of being added for the transport of freight;

calculating a residual capacity of the at least one transport determined by a difference between the passenger capacity and the passenger transport demand;

calculating a transformation capacity of the at least one transport determined by a size of the residual capacity that can be transformed for the freight transport demand;

calculating a freight capacity of the at least one transport determined by the transformation capacity of the expandable freight capacity;

communicating the freight capacity to the logistical system by way of the communication unit; and physically reducing passenger seating in the at least one transport to decrease passenger carrying capacity and increase freight carrying capacity based on at least one of the freight transport demand, the expandable freight capacity of the at least one transport, and the transformation capacity of the at least one transport;

wherein the method is implemented via at least one of a road infrastructure and a rail infrastructure; and wherein the method is implemented in a public transportation vehicle to allocate capacity in the public transportation vehicle to transport passengers and/or freight based on passenger and freight transport demand.

2. The method according to claim 1, wherein the coordination system is further configured to register parameters related to the transported freight and calculate transportation costs based on the registered parameters.

3. The method according to claim 1, wherein the registered parameters include at least one of type, position, weight, volume, residence time in the at least one transport, traveled route, client, service level and price agreement.

4. A system for transporting passengers and freight, comprising:
   a coordination system comprising a calculation unit, a memory unit and a communication unit, wherein the coordination system is configured to coordinate transport of at least one of passengers and freight according to the method of claim 1; and
   at least one transport for transporting at least one of passengers and freight.

5. The system according to claim 4, wherein the system further comprises a control unit configured to:
   record a passenger reservation for transport in the passenger unit;
   record a predetermined service level of the passenger;
   record a place in the passenger unit associated with the reservation; and
   communicate a place at a location where the passenger unit is scheduled to stop for admitting the passenger in the passenger unit.

6. The system according to claim 4, further comprising a positioning system for positioning the at least one transport at a location where freight and/or passengers are to be taken by the at least one transport.

7. The method according to claim 1, wherein the step of physically reducing passenger seating in the at least one transport comprises physically swapping at least one passenger unit configured to transport people for at least one freight unit configured to transport freight.

8. The method according to claim 1, wherein the step of physically reducing passenger seating in the at least one transport comprises folding at least one passenger seat such that the at least one passenger seat is not usable for passenger seating.

* * * * *